3,436,964
RADIATION MEASURING INSTRUMENT
Stanley A. Dolin, Flushing, and Seymour Rosin, Massapequa Park, N.Y., assignors to The Warner & Swasey Company, Cleveland, Ohio, a corporation of Ohio
Filed Dec. 28, 1964, Ser. No. 421,553
Int. Cl. G01k 11/00; G01n 23/12, 21/26
U.S. Cl. 73—355
5 Claims

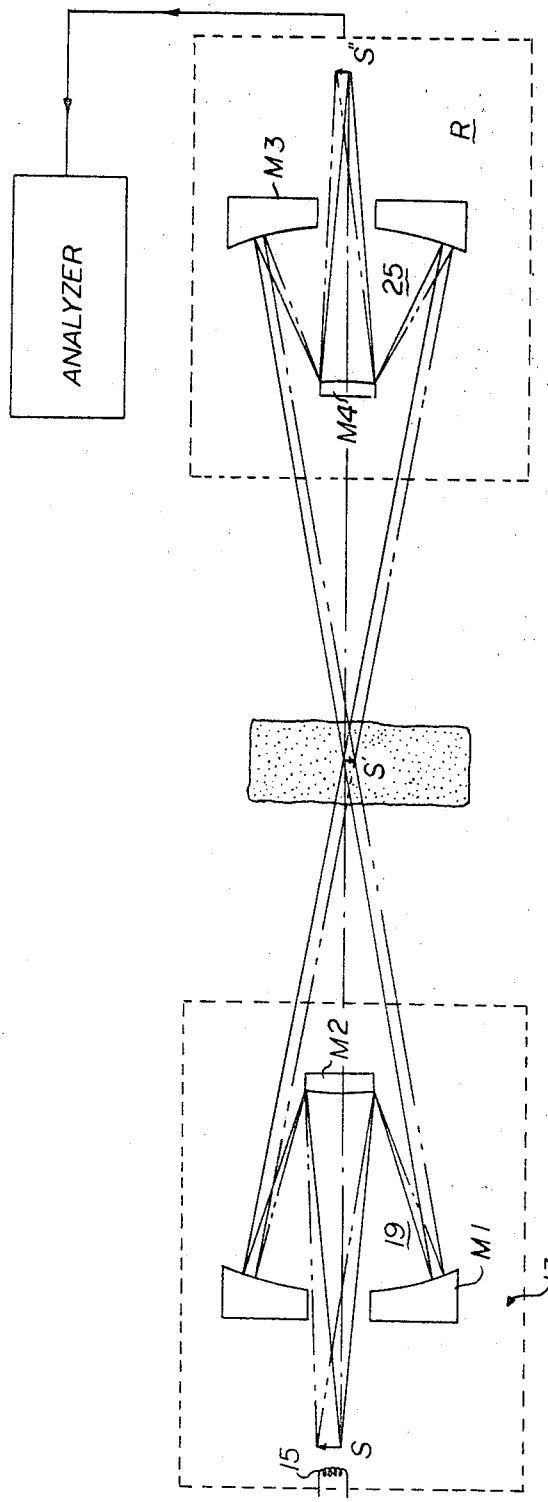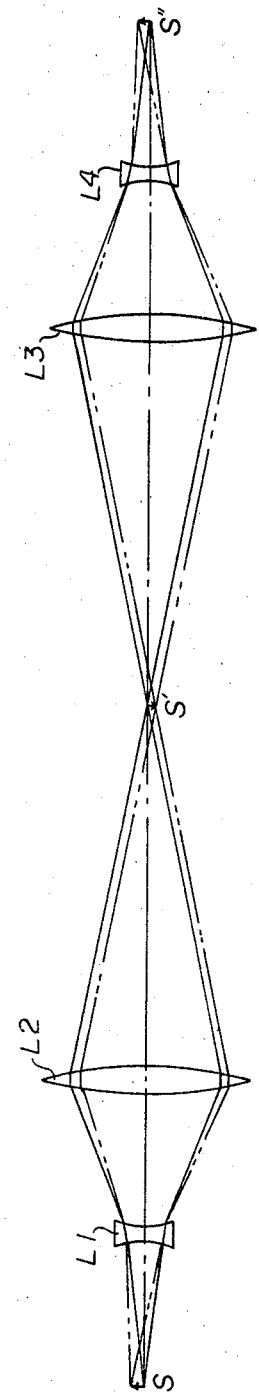
FIG. 1
FIG. 2
INVENTOR.
STANLEY A. DOLIN
BY SEYMOUR ROSIN
Williams, David,
Hoffmann & Yount
ATTORNEYS United States Patent Office 3,436,964
Patented Apr. 8, 1969

ABSTRACT OF THE DISCLOSURE

Apparatus and method for measuring gas temperature by analyzing reference radiation passed through the gas. An optical system on one side of a sampling region redirects a diverging beam of radiation from a source into a converging beam of collimated rays which is focused in the sampling region, and a second optical system on the opposite side of the sampling region redirects the radiation received from the focus in the sampling region into a converging beam which is focused on an exit slit. Each optical system has a beam-diverging optical element located in the focal plane of another optical element which transmits or receives the collimated rays to or from the sampling region. These beam-diverging optical elements are optically conjugate and matched optically in size.

---

The present invention relates to an instrument for determining the characteristic of a material by analyzing radiation and, particularly, to an instrument in which radiation from a reference source is used to provide at least part of the radiation to be analyzed.

The preferred embodiment of the invention is embodied in the type of the instrument shown in Tandler et al. Patents Nos. 2,844,730, 2,844,032 and 2,844,033 issued July 22, 1958. In these patents, a beam of reference radiation from a reference source is directed through a hot gas whose temperature is to be measured. The reference radiation generated by the source together with radiation emitted by the hot gas is collected and analyzed to determine the temperature of the gas. The gass will absorb certain of the reference radiation and also emit radiation in a manner which is a function of the gas temperature.

One of the problems present in instruments such as shown in the aforesaid Tandler et al. patents, is that of directing the reference radiation through the gas and collecting the beam in an efficient manner. Normally, in optical systems where there is a symmetrical arrangement about an intermediate focus, vignetting results unless a field lens is placed at the intermeditae focus. In instruments such as shown in the Tandler et al. patents, the hot gas whose temperature is to be analyzed is preferably located at an intermediate focus of the optical system for passing the beam of reference radiation through the hot gas. Obviously a field lens cannot be used to prevent vignetting since it would have to be located within the hot gas area.

Accordingly, it is an important object of the present invention to provide a new and improved instrument in which reference radiation is directed into an area at an intermediate focus of the optical system of the instrument where the characteristics of a body are to be analyzed with the optical system being so constructed and arranged that it is not necessary to use a field lens to prevent vignetting and obtain high efficiency of the transmission of the reference radiation through the area to be analyzed and the optical system of the instrument.

Another object of the present invention is to provide a new and improved instrument in which radiation from a reference source is directed to an area where it is combined with radiation from a source to be analyzed; the system being so constructed and arranged that the directing of the beam of reference radiation to the location where it is modified and the collecting of the beam do not result in the losses other than the normal reflection losses or lens transmission losses depending upon whether it is a mirror system or a lens system.

Yet another object of the present invention is to provide a new and improved instrument in which an in-line optical system directs radiation from a reference source through a sampling area which emits and absorbs similar radiation, and in which high transfer efficiency is obtained even though the optical system is optically symmetrical about an intermediate focus in the area of sampling.

In the preferred and illustrated embodiment, the radiation originates from a reference source S. The radiation from the source S is collected and focused by a first optical system, preferably by a Cassegrainian system, at an intermediate focal plane S'. The radiation source to be analyzed is also at S'. The collected light from the first optical system passes through the focus S' and is collected by a second optical system, preferably a Cassegrainian system, and converges to a focal plane S" at the exit slit of the system. In accordance with the present invention, the first optical element which receives the light from the reference source is imaged onto the last optical element which forms the image S" at the exit slit.

In the preferred and illustrated embodiment, the first optical element is the secondary of a Cassegrainian system, comprised of a primary mirror $M_1$ and a secondary mirror $M_2$ and the last optical element is the secondary mirror of a second Cassegrainian system having a primary mirror $M_3$ and a secondary mirror $M_4$. The primary mirror $M_1$ of the system has a central opening through which light from the reference source S passes to the secondary mirror $M_2$. The mirrors $M_1$, $M_2$ are reflecting mirrors with mirror $M_1$ being a concave mirror and the mirror $M_2$ being a convex mirror. The latter is located at the principal focal plane of the mirror $M_1$. Since the mirror $M_2$ is at the principal focal plane of the mirror $M_1$, the miror $M_1$ will image the surface of mirror $M_2$ at infinity and rays from a point on the surface of mirror $M_2$ and striking mirror $M_1$ will be reflected along generally parallel lines. These energy beams, however, will form a converging beam and image the source S at an intermediate focus for the optical system and then form a diverging beam.

The second Cassegrainian system is optically symmetrical to the first Cassegrainian system and works in reverse. The energy beam diverging from the intermediate focus S' is collected by the second Cassegrainian system and focused at S". At the same time the rays originating from the surface $M_2$ and rendered into generally parallel lines by $M_1$, as described above, are converged by mirror $M_3$ and focused on mirror $M_4$. The optical systems may be symmetrical or unsymmetrical and when the systems are Cassegrainian, the controlling factor is that the reflecting surfaces of secondary mirrors $M_2$ and $M_4$ be optically conjugate and matched optically in size.

Further objects and advantages of the present invention will be apparent from the following detailed description thereof made with reference to the accompanying drawings in which, FIG. 1 illustrates an instrument using a double Cassegrainian system; and FIG. 2 illustrates an instrument using a lens transfer system.

While the present invention is susceptible of use with various types of instruments and radiation, it is particulary advantageous when used to measure the temperature of hot gases. In such a system, infra-red radiation is analyzed to determine the temperature of the gases.

Referring to FIG. 1, an instrument of the type shown in the aforesaid Tandler et al. patents is indicated schematically. As in the aforesaid Tandler et al. patents, a source unit for providing reference radiation is generally designated by the reference numeral 13. The reference radiation is directed through a "sampling region" Y and the resultant radiation is focused by a receiving optical system R onto a slit at S".

The reference radiation source unit may include an infra-red element 15, for example, a Nernst glower, adapted to emit radiant energy in the infra-red spectrum. The radiation from the emitting element 15 follows an optical path onto a secondary mirror $M_2$ of a first Cassegrainian system 19 comprising a primary mirror $M_1$ and a secondary mirror $M_2$. The first Cassegrainian system forms an image of the source S at S' in the sampling region Y, the point S' being an intermediate focal point of the system as will appear hereinafter.

The intermediate focus S' is in the sampling region of the instrument and the radiation from the first Cassegrainion system passes through the sampling region and is collected by a second Cassegrainian system 25. The second Cassegrainian system comprises a primary mirror $M_3$ and a secondary mirror $M_4$ and causes the energy from the first Cassegrainian system to converge and to image the source S at S".

In passing through the sampling region Y, certain wave lengths of the infra-red radiation may be absorbed by the hot gases or additional radiation in these wave lengths or others may be emitted by the gas. The resultant radiation is indicative of the temperature of the gas and may be analyzed as explained in the aforesaid patents.

As is shown in FIG. 1 of the drawing, the first Cassegrainian system comprises a primary concave mirror $M_1$ and a secondary convex mirror $M_2$. The primary mirror $M_1$ is located between the source S and the secondary mirror $M_2$ and the beam from the source S passes through a central opening in the primary mirror and strikes the convex reflecting surface of the secondary mirror $M_2$, which faces the concave reflecting surface of the primary mirror $M_1$. The secondary mirror $M_2$ is at the principal focal plane of the primary mirror $M_1$ so that the mirror $M_1$ images the surface of the mirror $M_2$ at infinity. The radiation beam from the source S is reflected by the convex surface of the secondary mirror $M_2$ to the concave surface of the primary mirror $M_1$. The concave surface of the mirror $M_1$ changes the beam of radiation from a diverging beam to a converging beam.

The converging beam from the source S will have a focus at S' and then diverge. The second Cassegrainian system is located on the side of S' remote from the first Cassegrainian system and collects the energy from the primary mirror $M_1$. The optical system is such that the primary mirror $M_3$ will image the surface of secondary mirror $M_2$ onto the surface of the secondary mirror $M_4$ of the second Cassegrainian system. Thus, all of the light from the source S which strikes the reflecting surface of the mirror $M_2$ is collected by this second Cassegrainian system and is redirected by the mirror $M_4$ through an opening in the primary mirror $M_3$ to form the image of the source S at S". The efficiency of the transfer system is limited only by reflection losses.

From the foregoing, it can be seen that the light from the reference source S is in the form of a diverging beam which is first redirected by the secondary mirror $M_2$ of the first Cassegrainian system onto the primary mirror $M_1$ which changes the beam from a diverging beam to a converging beam to form the intermediate focus $S_1$ in the sampling region. Since mirror $M_2$ is at the focal plane of the mirror $M_1$ the rays from the surface of mirror $M_2$ are collimated and these rays are collected by the primary mirror $M_3$ of the second Cassegrainian system and converted to a converging beam and focused on a secondary mirror $M_4$ at the focal plane of the primary mirror $M_3$. The Cassegrainian systems are optically conjugate and matched optically in size; thus, the entire surface of mirror $M_2$ is imaged on the surface of the mirror $M_4$. The mirror $M_4$ then redirects the converging beam to image the source S at the point S".

Certain elements of the system shown and described in the Tandler et al. patents have been omitted for the sake of simplicity and the aforesaid patents are incorporated for a detailed explanation of the complete system. For example, the light from the reference source may be chopped by a chopper wheel corresponding to the chopper wheel 16 of the Tandler et al. patents and the resultant beam from the sampling region may be imaged onto an entrance slit S" corresponding to the entrance slit 33 of the monochromotor section of the aforesaid patents. The part of the system after the entrance slit 33 corresponding to that in each of said patents is indicated by the block labeled "Analyzer" in the instant FIG. 1. The beam may then be handled in the same manner as disclosed in the aforesaid patents to analyze the radiation and determine the temperature of the hot gases.

FIG. 2 illustrates a lens system embodying the principles of the present invention. In the lens system, the diverging beam from the reference source S is directed by a negative lens $L_1$ onto the surface of a positive lens $L_2$. The negative lens is at the focal plane of the positive lens and the positive lens collimates rays from the surface of the negative lens and images the latter at infinity. The energy beam from the source S is converted by the positive lens to a converging beam which images the source S at an intermediate focus S' and then becomes a diverging beam which is collected by a positive lens $L_3$ that operates to convert the beam to a converging beam and to image the negative lens $L_1$ onto a second negative lens $L_4$ located at the focal plane of the lens $L_3$. The negative lens redirects the converging beam and forms an image of the source S at S". Here again, the requirement is that $L_1$ and $L_4$ be optically conjugate and matched optically in size.

From the foregoing, it can be seen that the present invention provides an in-line optical system for directing a beam of radiation through a sampling region which may be a region in which a radiation-emitting body, such as hot gas, is located as well as one in which a body is located which absorbs certain wave lengths of the band of radiation from the source unit. The beam of radiation from the reference source passes through the material and is modified either by the absorption or emission, or both, of radiation in the sampling region and the resultant beam is collected by an optical system which is conjugate and matched optically in size to the optical system for directing the reference radiation through the sampling region. The efficiency of the entire optical system is limited only by reflecting or transmission losses and vignetting is not a problem even though the optical system is symmetrical about an optical focus.

Having described our invention, we claim:

1. In an instrument for determining a characteristic of a material in a sampling region by analyzing a beam of radiation which is modified by said material, an apparatus comprising means for directing a beam of radiation through said region comprising a source of radiation on one side of said region, a first optical element illuminated by a diverging beam of radiation from said source, said first optical element redirecting said beam of radiation in a divergent manner, a second optical element receiving radiation from said first optical element, said first optical element being located substantially in the focal plane of said second optical element so that said second optical element converts said redirected beam to a converging beam of substantially collimated rays which images said source in said sampling region, said redirected beam of collimated rays diverging on the remote side of said sampling region from said source, a third optical element on said remote side for collecting the divergent beam of collimated rays and converting the latter to a converging beam, a fourth optical element located substantially in the focal plane of said third optical element, said first and fourth optical elements being optically conjugate and matched optically in size, and said fourth optical element directing the convergent beam from said third optical element and imaging said source on the side of said third optical element remote from said source.

2. Apparatus according to claim 1, wherein said first and second optical elements are respectively the convex secondary mirror and the concave primary mirror of a first Cassegrainian system, and said third and fourth optical elements are respectively the concave primary mirror and the convex mirror of a second Cassegrainian system.

3. Apparatus according to claim 1, wherein said first optical element is a negative lens, said second optical element is a positive lens, said third optical element is a positive lens, and said fourth optical element is a negative lens.

4. In an instrument for determining by measurement of radiation at a given wave length a characteristic of a material developing a spectrum of radiation in a given region, an apparatus comprising a source of radiation, an in-line optical system comprising a first Cassegrainian system having a concave primary mirror with an opening for passing a divergent beam of radiation from said source through said mirror, a convex secondary mirror positioned substantially in the focal plane of said concave mirror redirecting the beam onto the reflecting surface of said concave mirror, said concave mirror imaging the reflecting surface of said convex mirror at approximately infinity and substantially collimating the rays reflected from said convex mirror into a converging beam which images said source in said region, a second Cassegrainian system on the remote side of said region from said source and comprising a second concave primary mirror for receiving the radiation from said first concave mirror, said second concave mirror having an opening therein, and a second convex secondary mirror located substantially at the focal plane of said second concave mirror with its reflecting surface facing the second concave mirror, said concave mirrors imaging said first convex mirror on said second convex mirror and said second convex mirror directing the beam from said source through said opening in said second concave mirror and imaging said source on the side thereof remote from said second convex mirror.

5. The method of directing a reference source of radiation through a sampling region and collecting radiation transmitted by the region which comprises directing a diverging beam of radiation from a reference source onto an optical element which transmits the beam in a more diverging manner, collecting the beam of radiation from said optical element and substantially collimating the rays of the beam and focusing the collimated rays into a converging beam to form an image of said source in said sampling region, the beam of collimated rays from said sampling region diverging on the remote side of said region from the optical element, collecting the diverging beam of collimated rays on the remote side of said region and focusing the latter to image the first optical element and then redirecting the energy and focusing the beam to form an image of said source.

References Cited

UNITED STATES PATENTS

| | | | |
|---|---|---|---|
| 2,798,962 | 7/1957 | Wormser | 73—355 |
| 2,844,032 | 7/1958 | Tandler et al. | 73—355 |
| 2,844,033 | 7/1958 | Tandler et al. | 73—355 |
| 2,871,758 | 2/1959 | Moutet | 73—355 XR |
| 2,963,910 | 12/1960 | Astheimer | 73—355 |
| 3,048,699 | 8/1962 | Francis | 250—43.5 XR |
| 3,364,351 | 1/1968 | Palmer et al. | 250—43.5 |

FOREIGN PATENTS

| | | |
|---|---|---|
| 148,551 | 6/1961 | U.S.S.R. |

LOUIS R. PRINCE, *Primary Examiner.*

FREDERICK SHOON, *Assistant Examiner.*

U.S. Cl. X.R.

250—43.5